(12) United States Patent
Bent et al.

(10) Patent No.: US 7,409,642 B2
(45) Date of Patent: Aug. 5, 2008

(54) METHOD AND SYSTEM FOR APPLYING USER INTERFACE ELEMENTS TO DATA

(75) Inventors: Samuel W. Bent, Bellevue, WA (US);
David J. Jenni, Sammamish, WA (US);
Namita Gupta, Kirkland, WA (US);
Jeffrey Lawrence Bogden, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 702 days.

(21) Appl. No.: 10/717,024

(22) Filed: Nov. 18, 2003

(65) Prior Publication Data
US 2005/0108681 A1  May 19, 2005

(51) Int. Cl.
*G06F 3/00* (2006.01)
(52) U.S. Cl. ..................... 715/762; 717/109
(58) Field of Classification Search ........... 715/762, 715/517, 755, 866
See application file for complete search history.

(56) References Cited

U.S. PATENT DOCUMENTS

| | | | | |
|---|---|---|---|---|
| 6,219,055 | B1 * | 4/2001 | Bhargava et al. | 715/850 |
| 6,558,431 | B1 * | 5/2003 | Lynch et al. | 715/513 |
| 6,915,290 | B2 * | 7/2005 | Bestgen et al. | 707/2 |
| 6,978,422 | B1 * | 12/2005 | Bushe et al. | 715/734 |
| 2003/0088852 | A1 | 5/2003 | Lacas et al. | |
| 2003/0231204 | A1 * | 12/2003 | Hanggie et al. | 345/744 |
| 2004/0189669 | A1 * | 9/2004 | David et al. | 345/619 |

FOREIGN PATENT DOCUMENTS

JP   0865000 A2 * 9/1998

OTHER PUBLICATIONS

Manning et al., Kirrkirr: Software for Browsing and Visual Exploration of a Structured Warlpiri Dictionary, LLC, vol. 16 (2), 2001, pp. 135-151.
Pietriga et al., VXT: Visual XML Transformer, HCC 2001 IEEE, 2 pages.
Hetherington et al. Adding a Fourth Dimension to Three Dimensional Virtual Spaces, Proceedings Web3D, Apr. 2004, pp. 163-172.
Saraiva, Joao, Component-Based Programming for Higher-Order Attribute Grammars, Berlin 2002, LNCS 2487, pp. 268-282.
Schmidt et al., Implementation of visual languages using pattern-based specifications, Softw. Pract. Exp. 2003; 33:1471-1505.

* cited by examiner

*Primary Examiner*—Stephen Hong
*Assistant Examiner*—Phenuel S Salomon
(74) *Attorney, Agent, or Firm*—Merchant & Gould PC

(57) ABSTRACT

Systems and methods for providing and associating or combining visual style information with data content. The present invention relates to associating a shared set of style information with two or more objects or items that are to be displayed as part of a list or some other visual grouping of the items. By sharing the style information, i.e., the visual representation characteristics information, a program developer need only define the style information or style once. Upon defining the style, the developer can declaratively associate all the items in the list or group with the defined style.

16 Claims, 11 Drawing Sheets

METHOD AND SYSTEM FOR APPLYING USER INTERFACE ELEMENTS TO DATA

FIELD OF THE INVENTION

The present invention relates to the general field of computer systems and applications designed to be executed on computer systems. More particularly, the present invention relates to an application development method and system for creating computer applications. More particularly still, the present invention relates to a framework for providing application developers better ways to combine user interface, e.g., display, elements with data, which is displayed in conjunction with a computer application.

BACKGROUND OF THE INVENTION

Computer systems are important tools used in many different ways, by many different people. Computer systems themselves, however, are only one aspect of the utility provided. Another important tool that works in conjunction with computer systems, are the applications, i.e., computer applications that are executed on the computer systems. These computer applications are programs, typically written by application developers, compiled into object code, and then stored on the various computer systems for operation. The creation and use of computer applications is a well-known aspect of computer technology in general.

When creating a computer application, the developer typically must chose a particular environment, or platform on which the application will ultimately be executed. For example, when writing an application, the developer must choose either the Microsoft Windows® platform, the LINUX™ platform, or some other platform. As a result of this choice, the program developer may have different options available for writing the application.

As an example, the typical platform provides a user interface display engine that receives commands and information from the application during runtime and responds by displaying that information on a user interface device, such as a computer monitor. Thus, the application developer must create or program the application to make the right call to the platform to thus cause the platform to respond by displaying the right data, in the right format, when desired.

Typically, in order to make the right call, the program developer must create some program code that ties the data to be displayed with the user interface elements, e.g., font type, font size, font color, etc. such that the platform simply interprets the command and renders the correct display. Although functional, this process suffers certain drawbacks.

For instance, when displaying a list of items, wherein each listed item has the same user interface elements, the program developer must explicitly tie each list item to the user interface elements. This is cumbersome and repetitive since the user interface elements must be repeated for each item. Also, when the data is tightly connected to the user interface the process of making changes is very difficult in that each change requires a translation back into the data's native form before storing and/or propagating to other computer processes and systems. Furthermore, the developer must understand not only the content but how it ties to the user interface control elements.

It is with respect to these and other considerations that the present invention has been made.

SUMMARY OF THE INVENTION

The present invention relates to systems and methods for providing and associating or combining visual style information with data content. In particular, the present invention relates to associating a shared set of style information with two or more objects or items that are to be displayed as part of a list or some other visual grouping of the items. By sharing the style information, i.e., the visual representation characteristics information, a program developer need only define the style information or style once. Upon defining the style, the developer can declaratively associate all the items in the list or group with the defined style.

According to aspects, the present invention involves systems and methods for providing a user interface framework that renders data according to a visual style defined for the data type. Typically, the system includes a plurality of objects, wherein the objects have one or more data fields and a style definition module for holding one or more visual style definitions to be selectively applied to the one or objects wherein the objects are independent from the visual styles. Additionally, the system has a style lookup module for locating an associated visual style definition along with a binding module for binding one or more of the plurality of data fields to one of the properties of the appropriate visual style definition. Further, the system has a tree assembler module for generating a visual representation of the data based on the style definition and a rendering engine for displaying the data using the bound style definition. The system may further include a layout engine for providing additional user interface elements and a user interface element factory for adding additional user interface elements to the data. A change in the data causes a relatively automatic change in the present display.

With respect to the object themselves, in an embodiment the objects are displayed as a list, while other embodiments display the objects as menus, parts of combo boxes, or some other control. In accordance with particular aspects, the objects form a group, and the system has a group visual style definition being independently defined from the data items. In such a case the tree assembler module generates the visual representation based on the group visual style.

In accordance with other aspects, the present invention relates to a method of displaying data according to an appropriate style. The method involves receiving a request to display one or more data items and then locating the appropriate visual style, wherein the style is independently defined from the data items. Next the method generates a visual tree using the data items and the appropriate style and binds properties in the visual tree to properties of the data items. Last the method renders the display based on the visual tree. In an embodiment, the process involves declaring the data items using data objects and automatically updating the visual tree in response to a change to a relevant data item. The change to a relevant data item may involve an edition, addition or deletion of a relevant data item.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

DETAILED DESCRIPTION OF THE INVENTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
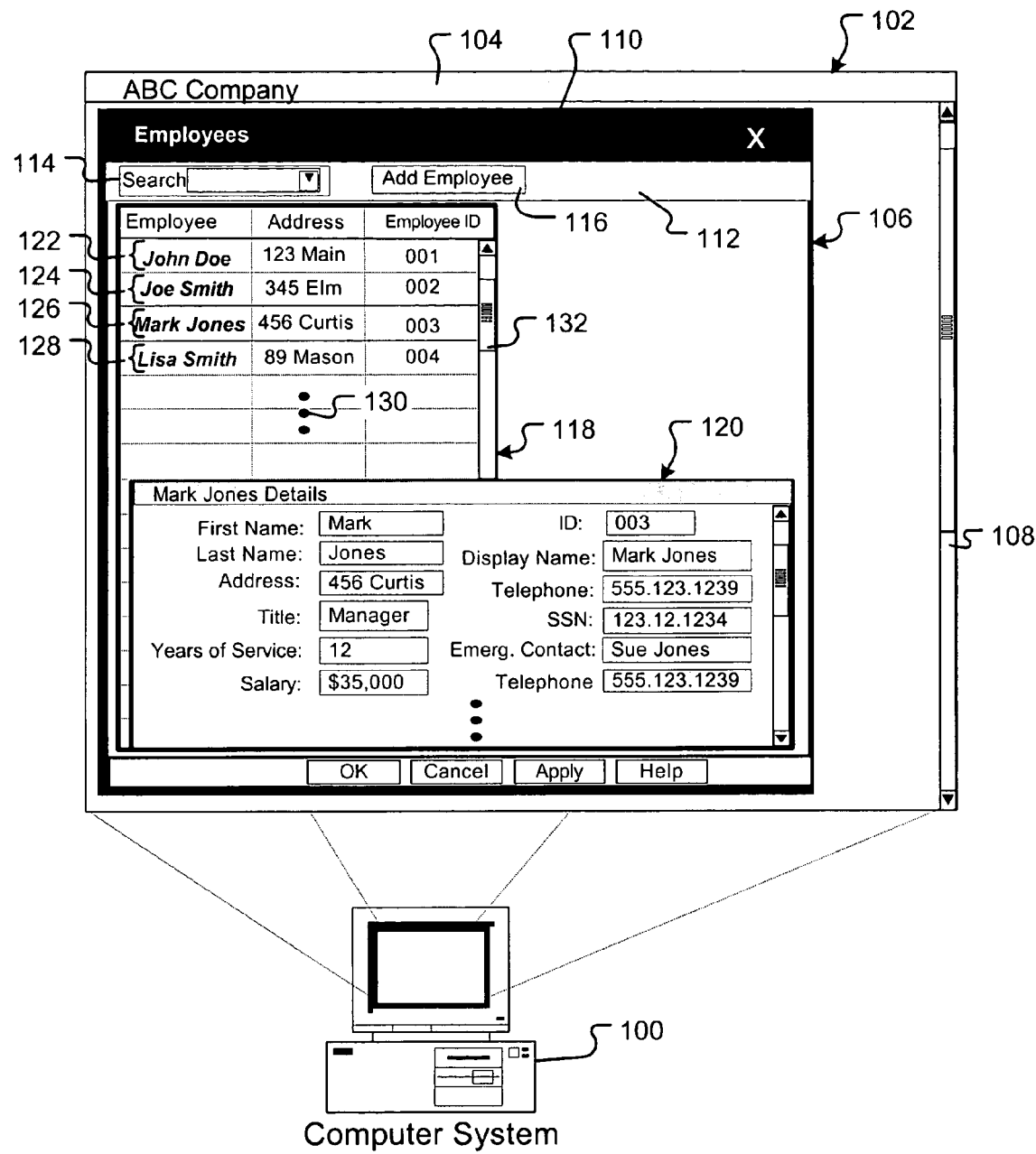
FIG. 1 illustrates an exemplary system, including an exemplary display created in accordance with aspects of the present invention.

In general, the present invention relates to a new and improved method of providing or combining visual style information with data content. In particular, the present invention relates to associating a shared set of style information with two or more objects or items that are to be displayed as part of a list or some other visual grouping of the items. By sharing the style information, i.e., the visual representation characteristics information, a program developer need only define the style once. Upon defining the style, the developer can declaratively associate all the items in the list or group with the defined style. A computer system 100 that may be used to render a list or group of items onto a display in accordance with the present invention is shown in FIG. 1. As used herein, a "computer system" shall be construed broadly and is defined as "one or more devices or machines that execute programs for displaying and manipulating text, graphics, symbols, audio, video, and/or numbers."

The computer system 100 displays information, such as display screen 102. The display screen 102 is enlarged to show details of the display. The display 102 relates to an over-simplified display of an example company application used to manage different portions of a business, employee information for example. Importantly, although display 102 displays employee content information, many other types of content may be managed and displayed in accordance with the present invention and thus, the employee example is not meant as a limitation, but merely as an illustration.

In this particular example, the display 102 has a title bar 104 and an employee window 106. There may be other windows for managing other information as indicated by scroll bar 108. Employee window 106 has a title bar 110 and a tool bar 112. Tool bar 112 provides user controls such as a search control 114 and an add employee control 116, among potentially many others. Such user interface controls are generally known in the art and are useful in managing certain types of information.

Within employee window 106, there are two sub-windows, such as employee list window 118 and employee detail window 120. In this particular example, employee window 118 displays a list of all the employees working for ABC Company. In a particular embodiment, as discussed in more detail below, each set of employee information may be a distinct object stored in a database or other datastore. As an object, e.g., of class "Employee," each has a set of properties. For example, the properties for each employee may include a name property, an address property and an employee identification value or ID property. The exemplary window 118 displays four employee objects 122, 124, 126 and 128 and has been designed to display these three properties associated with each employee object. Although four employee objects are represented in the list window 118, many more may be shown as indicated by the ellipses 130 and the scroll bar 132.

In order to create the employee window 118, a developer of the application may utilize a list control. In an embodiment, the application used to display the window 118 was created for the operating system platform developed by Microsoft Corporation. In such a case, the use of a control such as "ListBox" or others may be implemented to generate the window 118. ListBox, as well as other controls such as menu controls, are given the ability to manage a collection of items of arbitrary type.

The details window 120 will be discussed in more detail below, but in general, the details window 120 displays more object properties for a highlighted object, such as the Mark Jones object shown in FIG. 1. That is, when the object 126 having the Mark Jones property field is highlighted or selected by the user from window 118, a details window, such as window 120 may be displayed, wherein the window 120 displays many more properties associated with the Mark Jones object.

The present invention relates to the associating of objects, such as the employee objects represented by FIG. 1 in window 118, with user interface style elements in order to provide such items to a rendering engine, which in turn displays the list of items in a predetermined format, as shown in FIG. 1. The objects 122, 124, 126 and 128 are each displayed using the same basic style definition. That is, the font size and type of the name property is the same for all objects when displayed. In display 102, the name properties of all the employee objects are displayed using italics. Importantly, in an embodiment of the present invention, defining the use of italics for displaying the name properties of the listed objects need only be done once by the developer of the application that is used to list the employee objects.

Figure 2:
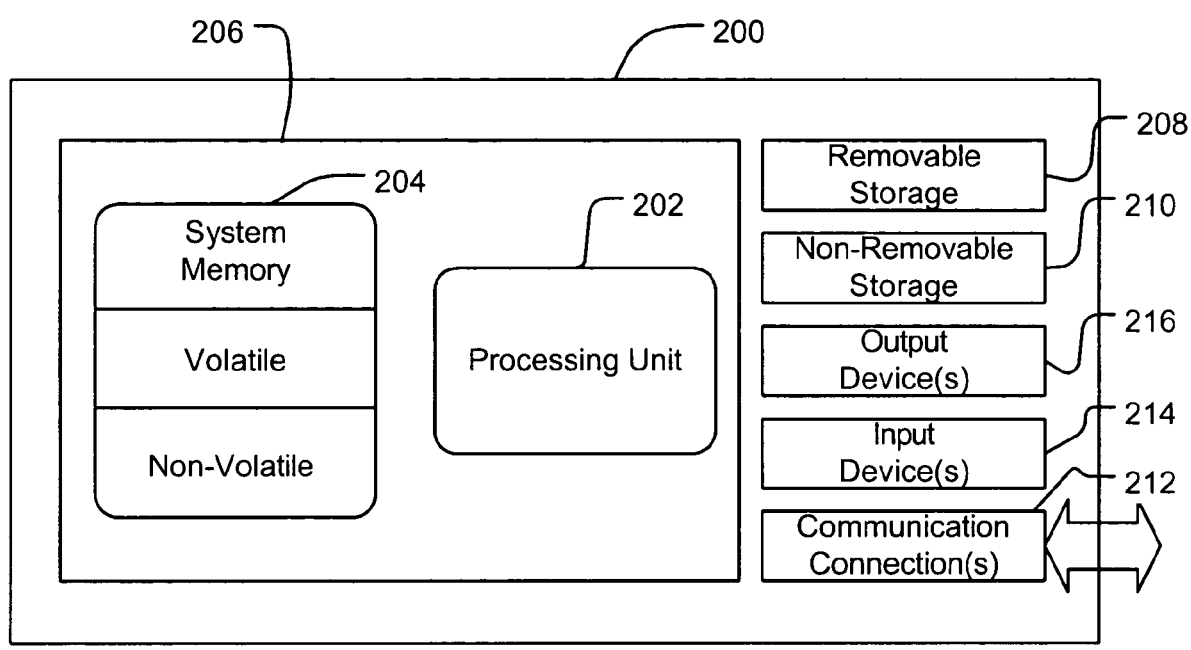
FIG. 2 shows a computer system on which embodiments of the present invention may be implemented.

FIG. 2 illustrates an example of a suitable computing system 200 on which embodiments of the invention may be implemented. As such, this system 200 is representative of one that may be used to function as computer system 100 shown in FIG. 1. In its most basic configuration, system 200 includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by line 206.

In addition to the memory 204, the system 200 may include at least one other form of computer-readable media. Computer readable media, also referred to as a "computer program product," can be any available media that can be accessed by the system 200. By way of example, and not limitation, computer-readable media might comprise computer storage media and communication media.

Computer storage media includes volatile and non-volatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

The exemplary computing system 200 may also contain a communications connection(s) 212 that allow the system to communicate with other devices. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with an embodiment, the system 200 includes peripheral devices, such as input device(s) 214 and/or output device(s) 216. Exemplary input devices 214 include, without limitation, keyboards, computer mice, pens, or styluses, voice input devices, tactile input devices and the like. Exemplary output device(s) 216 include, without limitation, displays, speakers, and printers. Each of these "peripheral devices" are well know in the art and, therefore, not described in detail herein.

With the computing environment in mind, embodiments of the present invention are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached at the end of this specification.

Figure 3:
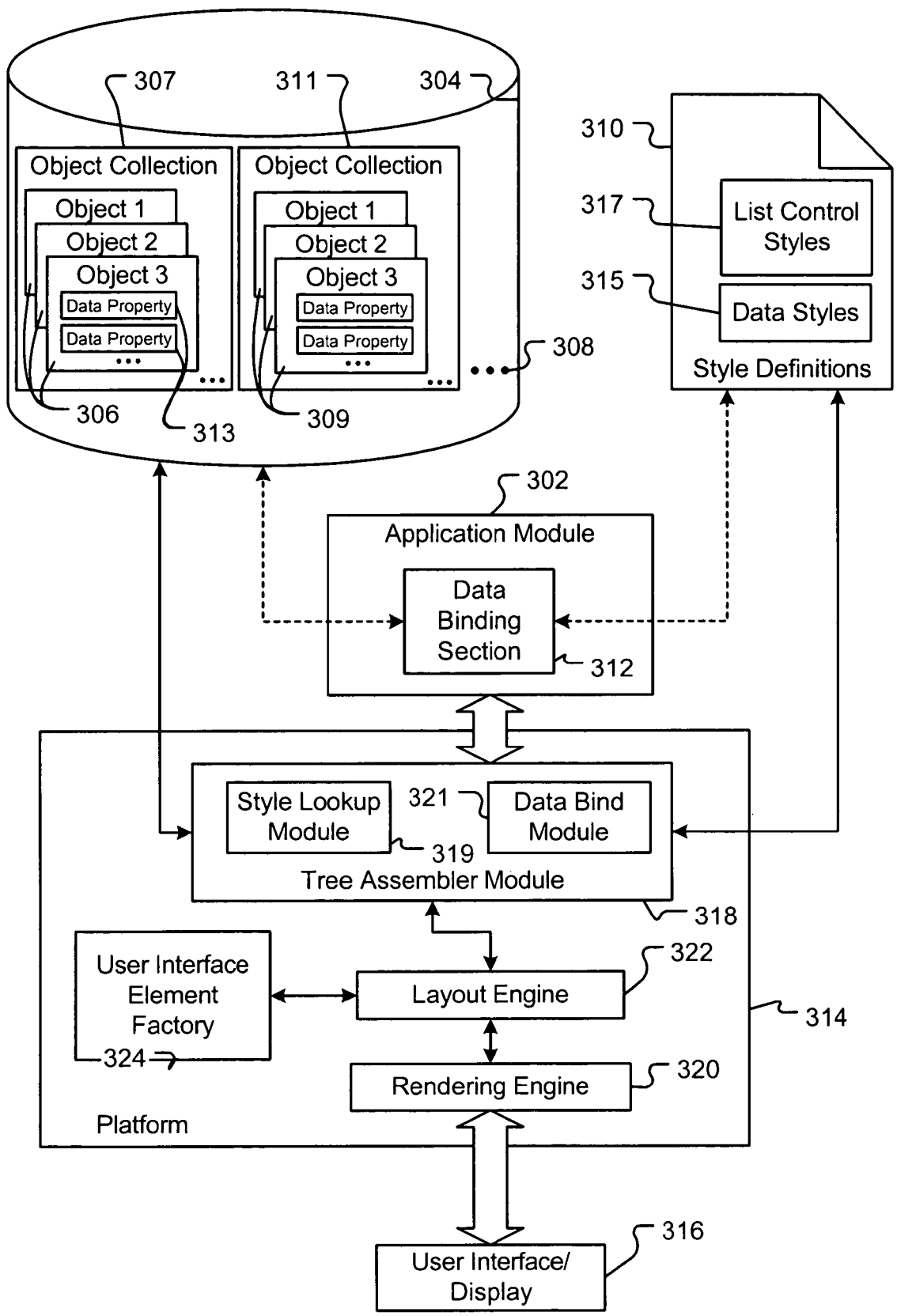
FIG. 3 illustrates a representation of the software environment for displaying objects according to aspects of the present invention.

Referring now to FIG. 3, the functional components used in associating the display elements, e.g., user interface (UI) elements with the data objects are logically illustrated in accordance with an embodiment of the present invention. In an embodiment all the components illustrated in FIG. 3 reside and operate on a single computer system such as system 100 described in conjunction with FIG. 1. Alternatively, one or more of the components illustrated in FIG. 3 may be performed on separate computer systems in a distributed network, as is known in the art.

An application module 302 developed in accordance with the present invention is shown in FIG. 3. The application module may represent any number of different computer applications or programs developed for use on many different types of computer systems. Indeed, in an embodiment, the application module 302 represents the employee management application provided as an example in conjunction with FIG. 1. The application module 302, therefore executes on a computer system such as computer system 100 to display a list of items, among other things. In an embodiment, the application module 302 accesses a datastore 304, which stores a plurality of objects 306, wherein the objects may have data content 313, along with associated methods and events (not shown). In accordance with embodiments of the present invention, the objects relate to items that are to be displayed in a list or other grouping, yet are independent of the user interface elements, i.e., how the object will ultimately be rendered. In other embodiments, the objects may be displayed as menu items or other group items. Although the objects 306 may be displayed, or some of their properties may be displayed per the present invention, those skilled in the art will recognize that these objects may be used in many other capacities as well. Also, datastore 304 may store many other items as indicated by the ellipses 308.

In a particular exemplary embodiment, the objects 306 may be managed as a set of similar objects in an object collection 307. An example may be an object collection relating to employee objects and therefore each object has the same properties or fields as the other objects. Of course the content of these properties or fields is different for different employee objects. In other embodiments, there may be other types of objects 309, such as customer objects as part of another collection 311 within the same datastore 304. The other types of objects have different properties or fields. For example, the employee objects have an employee ID value wherein the customer objects do not. Similarly, the customer objects may have an account number property where the employee objects do not. Those skilled in the art will recognize that there are many different potential types of objects having many different properties.

The application module 302 also accesses or is associated with style definitions 310. The style definitions may be developed or designed by the developer of the application module 302 or the definitions 310 may be created by a third party. The style definitions relate to the actual style properties to be associated with the data content of the objects 306 when the data is ultimately displayed. These data specific styles are shown as data style 315. A data style is stored separately from the data objects and is relatively independent of the data itself. A data style influences the display of data in two principal ways: (1) by specifying property values for the item itself, and (2) by specifying an internal representation for the item, e.g., a visual subtree. For instance, style definitions may include font size (such as 12 or 10 point, etc.), type (such as Arial or Courier, etc.), color (such as black or red, etc.), attributes (such as bold or italics, etc.), location (such as position on the display), etc. Also, the style also describes a visual subtree to aid in the creation of an internal visual representation of the items, such as for a given data object which fields should be displayed. The visual tree is discussed in more detail below.

Moreover, the style definitions may be sub-divided into separate style definitions for each of the properties of each object to be displayed. In a particular embodiment, a style definition may be stored for each class of objects. For example, the employee class of objects may have its own predetermined style definition and the customer class of objects may have is own, unique predetermined style definition. However, as discussed below, in an alternative embodiment, one style definition may be used for objects of different types.

The style definitions 310 may also contain list control style information 317 which provides visual style information for the list control itself, independent of the data to be displayed in the list control. That is, there may be a significant amount of user interface information regarding the building of a list on a display including size information, border information, shading and color information, how the user interacts with the list, such as mouse interaction, etc. The list control style 317 is used to provide such information.

In an embodiment, the application module 302 has a data binding section 312 that, during operation, causes data content 313, i.e., properties of the data objects 306, to be ultimately bound to the UI elements or properties of a style definition such as definition 315. The data binding section 312 relates to the declarative program statement(s) that associates one or more data objects to a data style. Such an association may be made by explicitly identifying the data types and the data style for that type, or by providing a style selector call, or by providing a default style, or by some other method.

Application module 302 operates on platform 314. Platform 314 relates to the framework or application programming interface (API) that provides the necessary communication between the application module 302 and the operating system of the computer, such as computer 100 shown in FIG. 1. As such, the platform 314 provides the intermediate functions and services to allow the application module 302 to ultimately display a list of items, such as objects 306, on a display 316. Although not shown, the operating system and its necessary operations occur between platform 314 and display 316. In a particular embodiment of the invention, the platform 314 is the Microsoft Windows® platform developed by Microsoft Corporation.

Within the platform 314, a tree assembler module 318 parses the information received from the application module 302 in order to build a "visual tree" which is an internal representation of the display and thus represents the combination of the data from the objects 306 to be displayed and the information from the style definitions that describes how to display the data. The visual tree is described in more detail below in conjunction with FIG. 5. In an embodiment, the tree assembler module 318 includes a style lookup module 319 and a data bind module 321 which are used to locate the appropriate style elements and to bind a property of a UI element to a data property, i.e., establish the desired links. Essentially, the application module 302 makes requests to the style lookup module 319 to lookup the correct style definition and to the data bind module 321 to make the links. As stated above, these requests may be declarative, i.e., interpreted by the tree assembler module 318, or procedural, i.e., the application 302 calls the binding methods at runtime. Moreover, the data styles, such as style 315 may also have a declarative request for binding to data as well. In such a case the data bind module 321 handles these requests too. More details of the binding process may be found in copending U.S. patent application Ser. No. 10/440,081, titled "SYSTEM AND METHOD FOR CONTROLLING USER INTERFACE PROPERTIES WITH DATA" filed on Oct. 23, 2003, assigned to the assignee of the present application, and incorporated herein by reference for all that it discloses and teaches.

In an embodiment, the tree assembler 318 receives the data content and the style information directly from the application module 302. In other embodiments, the tree assembler 318 may access the required content and style information directly from the datastore 304 and the definition module 310, respectively, through the operation of the data bind module 321. In doing so, the tree assembler 318 understands where to look and what to find based on the binding information received from the application's data bind section 312.

The tree assembler module 318 completes the visual tree and passes the tree to the rendering engine 320. In an embodiment, the tree is passed relatively directly to the rendering engine 320, which, in turn uses the visual tree to render the display on the user interface display 316. However, in an alternative embodiment, the visual tree is passed first to a layout engine 322 that adds more information to the visual tree, using user interface elements from factory 324 to complete the tree. The layout engine, in an embodiment understands the physical properties of the display such that it can determine where to place certain display items and how large to make them relative to the physical characteristics of a particular computer system.

Of course, the application module 302 and the tree assembler module 318 operate in a dynamic environment wherein the tree assembler may make an initial visual tree and as the application 302 runs, items and displays may change, such that the tree assembler 318 may rewrite or modify the visual tree to ultimately update the display.

Figure 4:
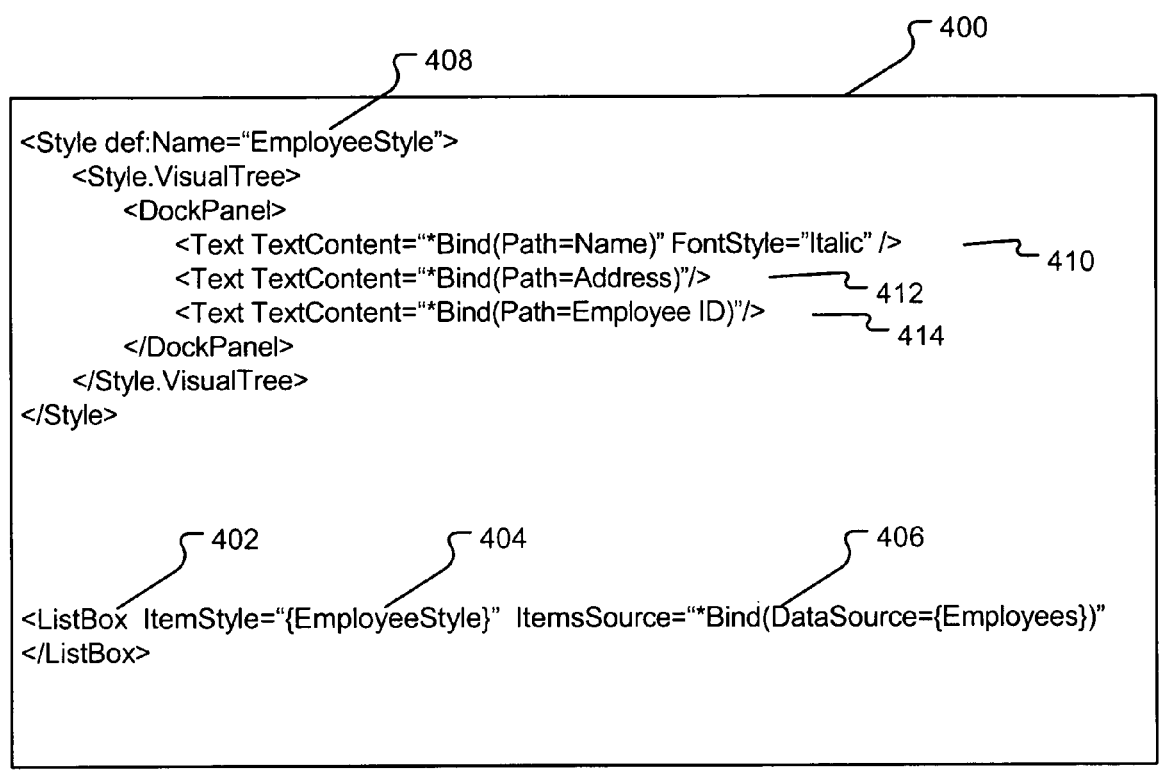
FIG. 4 is an exemplary listing in a mark-up language describing a visual style to be applied to a set of list item objects, along with mark-up language for requesting such a display.

A listing of some exemplary markup language, e.g., XAML code is provided in FIG. 4 to illustrate the defining of a style, such as those defined in style definitions 310 for use by the tree assembler module 318 (FIG. 3). As may be appreciated, the code snippet 400 is only one example of the way in which the concepts described herein may be implemented and should not be considered limiting to the shown syntax. Line 408 represents the declaration or definition of a new style named "EmployeeStyle". The name here is merely an example that continues the example shown and described above in conjunction with FIG. 1 wherein a number of employee objects may be listed. Following the definition of the style name, the markup describes the visual tree in the next seven lines. The visual tree consists of a dock panel that contains three text controls 410, 412 and 414. The visual tree essentially states that when an employee is being displayed, three properties of the employee are to be shown as text (via the Text controls), using layout rules supplied by the surrounding DockPanel. The first control 410 binds the data from the name field of the employee object to be displayed first, such as in the first column. As may be appreciated other details may be required to make this example work, such as adding width dimensions for the columns to each text control, etc. Text control 412 binds the data from the address field of the employee object to be displayed second, such as in the second column. Next, text control 414 binds the data from the employee ID field of the employee object to be displayed third, such as in the third column. The style may be applied to all employee objects at runtime such that the style does not have to be associated with the data until runtime. Further, this one style definition can be applied to all employee objects such that the style does not have to be repeated when the employee objects are created.

As may be appreciated, many other user interface elements may also be built into the example style for employees. For simplicity, the exemplary style 408 is primarily concerned with displaying three primary employee fields in a particular order. This however, should not be considered a limitation as many other fields could be displayed, in many different orders, along with many other types of user interface elements (images, buttons, sliders, etc) As may be appreciated, the styled display is not limited to text.

FIG. 4 also illustrates a sample request to list employees. Command 402 represents a "ListBox" control syntax for XAML. The ListBox declaration contains an explicit "Item-Style" reference, in this case the item style is set to "EmployeeStyle" (portion 404). Indeed, this ListBox example calls the style definition described above. Further this ListBox example also provides the source of the items to be listed using 406, i.e., the "ItemsSource="*Bind (DataSource={Employee})"." Binding the items source in this manner indicates that the ListBox command is to list data from all the employee objects using the employee style defined previously. As a result, upon reaching the ListBox command 402, the tree assembler builds a visual tree 500 to list all the names, addresses and employee ids of all the employee objects in the employee collection.

Figure 5:
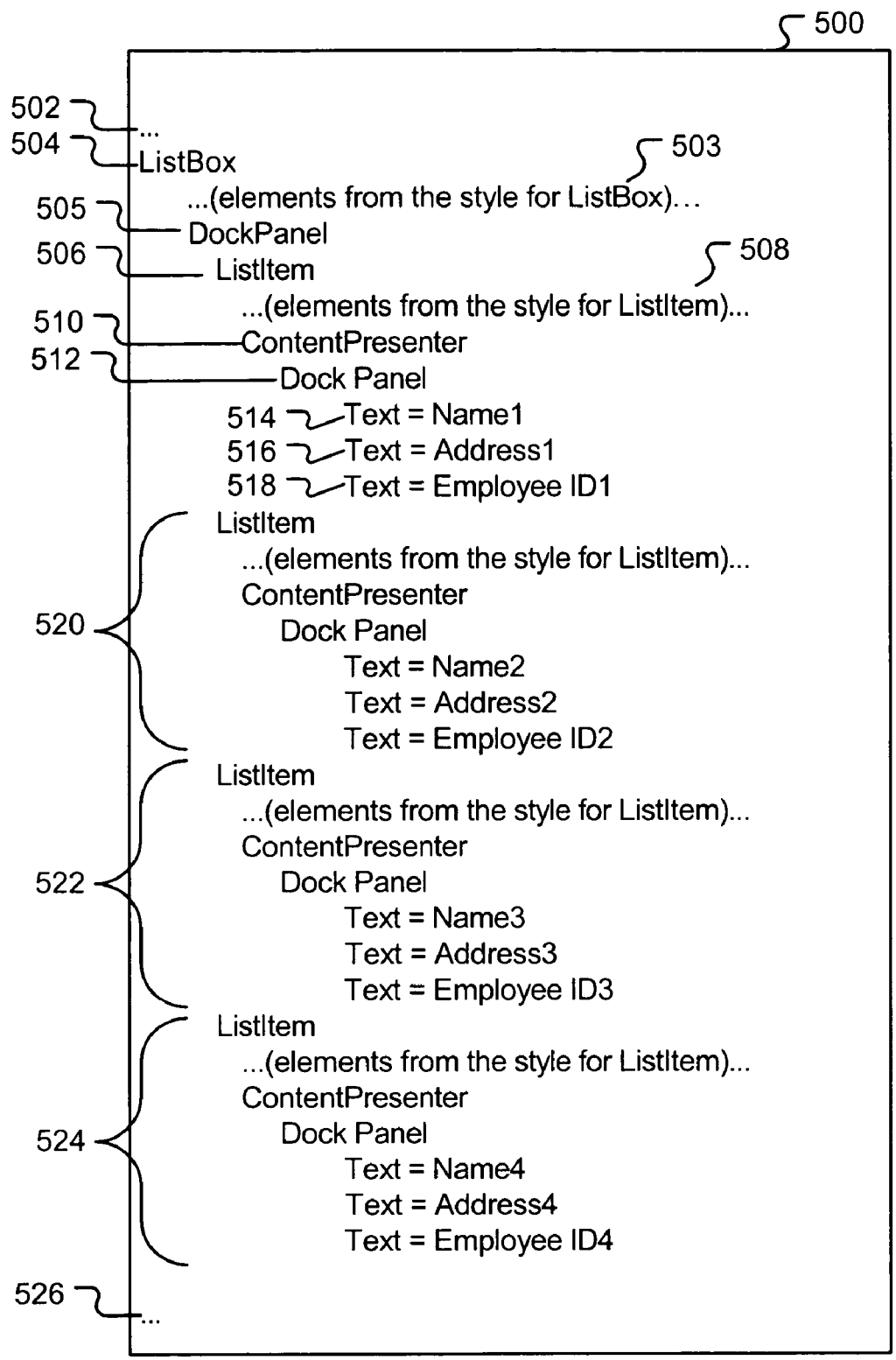
FIG. 5 is an exemplary depiction of a visual tree created in response to the request shown in FIG. 4.

An exemplary visual tree 500 is shown in FIG. 5. In accordance with aspects of the present invention, a "visual tree" is a representation that is in a tree-like structure having nodes for the visual representation of the elements to be displayed. Not all elements are in a visual tree as not all elements have visual information. Visual tree 500 is bounded by two sets of ellipses 502 and 526 to indicate that this is only a portion of a potentially larger visual tree.

The first item in visual tree portion 500 is the list box item 504. In essence, when building the tree, the tree assembler, such as tree assembler 318 shown in FIG. 3 encounters the list box item, such as ListBox command 402 shown in FIG. 4. Upon encountering the list box command, an entry for the list box is placed in the visual tree at position 504. Next, an inquiry is performed to determine the style information for the list box itself. Such style information may include properties of the ListBox as well as a visual tree. This visual tree might contain borders or shading information, controls for scrolling, or the like; in an embodiment, the tree contains one element (usually a Panel of some sort) with a property such as "ItemsHost="true"" that indicates where the UI for the data items belongs. The tree assembler sets the properties of the ListBox to their desired values, creates a copy of the desired visual tree, and adds it to the main visual tree at position 503.

Next the tree assembler creates the UI for the data items, one at a time, and adds it to the visual tree underneath the panel 505. This UI comes from two places. The first piece comes from the list control itself. In the example shown in FIG. 5, the ListBox indicates that it expects the first piece of the UI to be a ListItem; other list controls might indicate a different type of element—for example a Menu might indicate that it expects a MenuItem. In an embodiment, the manner in which the ListBox indicates that it expects a ListItem involves the use of an "ItemsControl" object which has a property called "ItemUIType." A derived class like ListBox sets this property to type of (ListItem). The tree assembler module 318 queries this property, and creates an element of the desired type. The tree assembler creates an element of this type (ListItem 506, in the present example), performs an inquiry for its style information, and creates the corresponding visual tree 508. This style information might describe how the user interacts with the list item, such as what happens when the mouse cursor hovers over a list item, etc.

The visual tree 508 typically contains a special element that indicates where the UI for the data item belongs. In one embodiment, this special element is a ContentPresenter 510. This is where the second piece of UI is added. The tree assembler performs an inquiry to determine the style information for the data item. It creates a copy of the visual tree described in that style, and adds it to the main visual tree at position 512. Thus the content presenter functions to "style" the data content.

The content presenter acts to retrieve the first object and upon receiving the object, such as an employee object, the tree assembler uses the defined item's style to layout the proper fields in the visual tree. For instance, the first element in the EmployeeStyle 408 is a Dock Panel command, such that a dock panel entry 512 is made in the visual tree. Next, with the dock panel, the EmployeeStyle requires that text be displayed, and the first text element be the name from the first employee object. The actual text is not placed here. Instead a binding is made here in order to account for later changes made to the actual data, i.e., when the data changes in the data item, the data associated with the visual tree 500 will also change. Next, text entries 516 and 518 are inserted into the visual tree to account for the lines 412 and 414 shown in FIG. 4.

This process is repeated for all the employee objects, such that sub-trees 520, 522 and 524 are entered into the visual tree. Upon completing the visual tree 500, the tree 500 may be passed to a layout engine, such as engine 322 (FIG. 3) for additional user interface elements prior to being sent to the rendering engine 320. In another embodiment, the layout engine calls the tree assembler as needed to generate the tree just in advance of the layout process. In essence, the layout engine and the tree assembler module are separate but cooperating modules. Rendering engine 320 accepts the visual tree 500 and uses the same to display the list of employees on the display.

Figure 6:
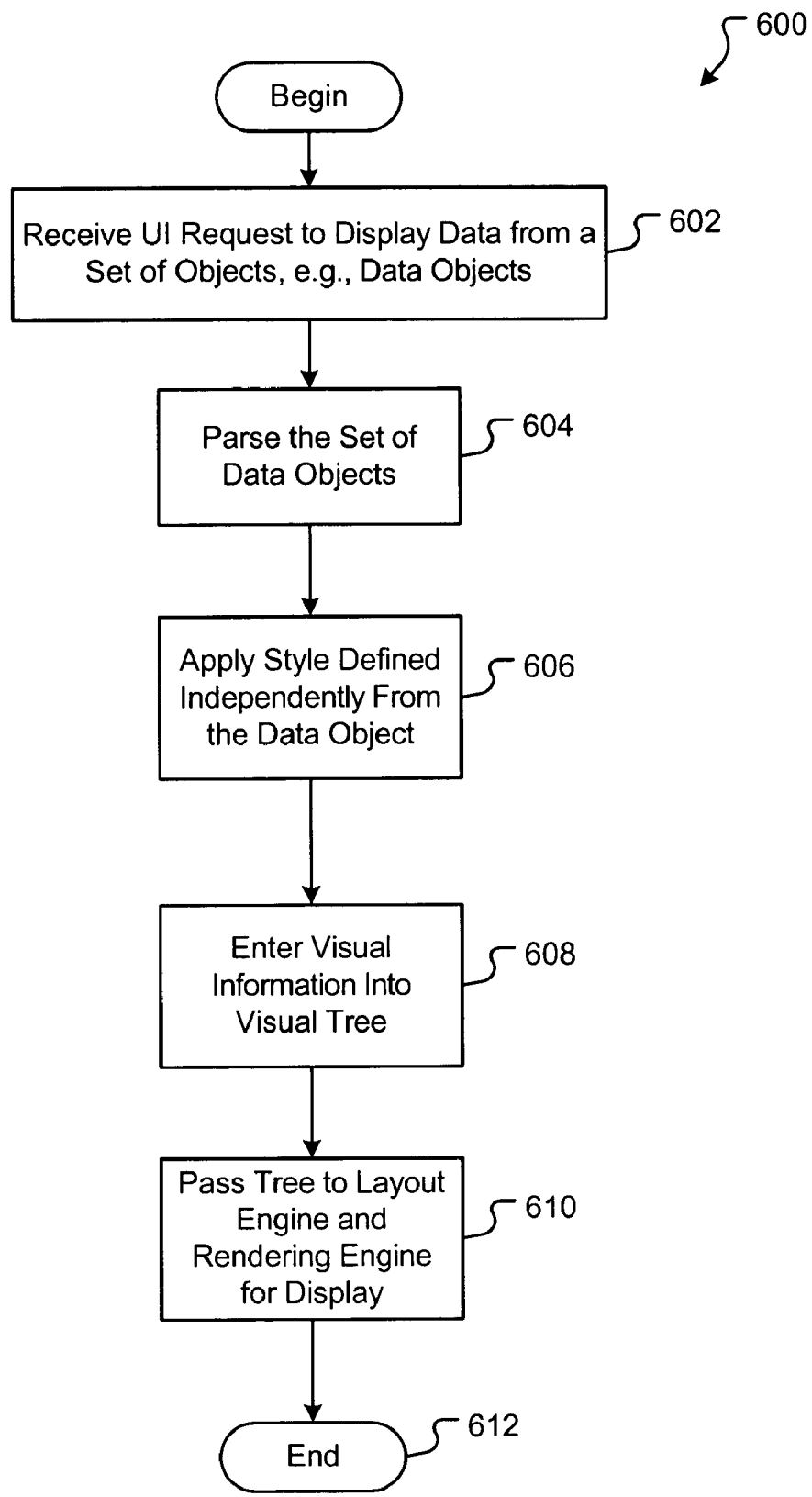
FIG. 6 is a flow diagram illustrating operations for associating style information with data content according to an embodiment of the present invention.

FIG. 6 illustrates the functional components of an embodiment of the present invention. An expert in the art will appreciate that an actual implementation may choose to perform these steps in a different order for purposes of efficiency or flexibility, while achieving the same effect, without departing from the sense of the present invention. Flow 600 relates to the display of a list of items from a set of objects. In this embodiment, the objects contain some data, wherein at least some of the data from these objects is to be displayed as part of a list. Although the objects may contain other information or pieces, such as methods and events, since we are primarily concerned with displaying the data, these objects are referred to as data objects for the purposes of FIGS. 6 and 7. Also, each of these data objects may have one or more fields or properties, each containing specific data for the object. The environment in which flow 600 begins involves, in an embodiment, an application, such as application module 302 (FIG. 3) that is running or executing on a computer system, such as system 100 (FIG. 1). The application module is operating on a platform, such as platform 314 (FIG. 3).

Initially, receive operation 602 receives a request to display data from a set of objects. The set of objects may be related in that each object is of the same type or the same class, but this is not necessary. Upon receiving the request to display data from the data objects, parse operation 604 parses the request. In parsing the request, parse operation 604 identifies that a list is to be displayed and determines whether any style should be applied to the list. Further, parse operation 604 iterates over the list of items and determines if any particular styles should be applied to the data items themselves.

In an embodiment, the request to display the data also includes some kind of style information. In essence, the style information causes requests, at runtime to the platform to establish links between the data and the associated styles. In establishing the appropriate links, a search operation may be performed to search for and locate the appropriate style.

Upon establishing the appropriate links, apply operation 606 applies any defined styles for the data objects. Although the style is described independently of the data, apply operation determines the necessary user interface elements to apply from the style such that a visual tree data structure may be built or modified. The modified visual tree may include some kind of binding information. This information causes requests at runtime to the platform to establish links between the properties of the UI elements and the properties of the data items. These requests may be declarative, i.e., interpreted by the platform, or procedural, i.e., the application, such as application 302 (FIG. 3) calls the binding methods at runtime.

In applying the defined style, flow 600 incorporates enter operation 608 which enters visual information into a visual tree. Enter operation 608 receives the results of the apply operation 606. That is, each data object is essentially associated with some style information, defined independently from the data itself. Enter operation 608 assembles the result of apply operation 606, including any links (bindings) as described above, and stores the information into a data structure, i.e., the visual tree. The visual tree has visual information for the all the data (and other user interface elements) to be displayed. Essentially, the application module 302 makes requests to the data bind module 321 to make these links. As stated above, these requests may be declarative, i.e., interpreted by the tree assembler module 318, or procedural, i.e., the application 302 calls the binding methods at runtime. Moreover, the data styles, such as style 315 may also have a declarative request for binding to data as well. In such a case the data bind module 321 handles these requests too.

Next, pass operation 610 passes the visual tree to the layout engine and rendering engine to apply more style information (if necessary) and to ultimately render the display items on a display device. Upon rendering the display, flow 600 ends at end operation 612.

Figure 7:
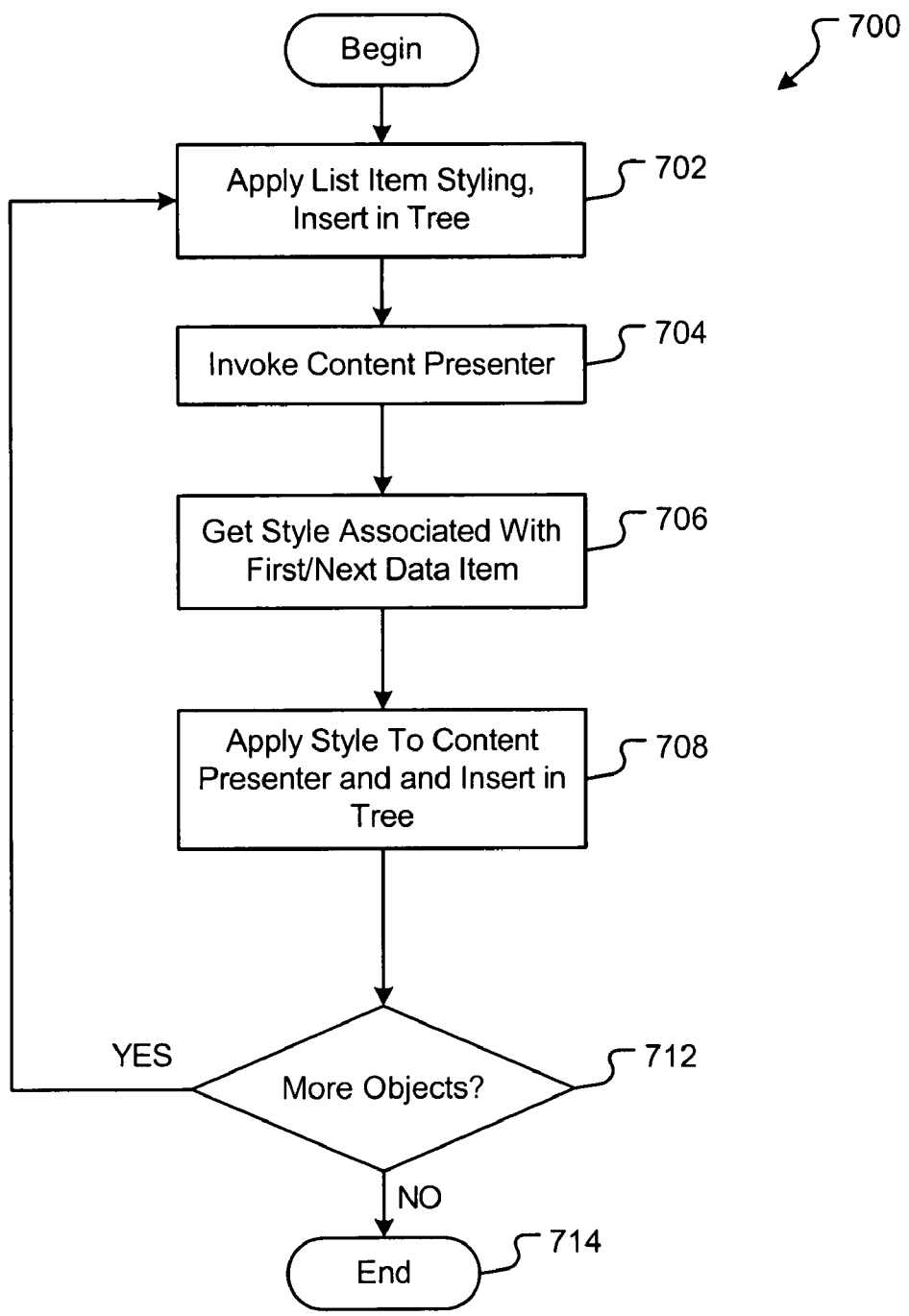
FIG. 7 is a flow diagram illustrating operations for associating style information with two or more objects having data content according to an embodiment of the present invention.

Flow 700, shown in FIG. 7, provides more details of the process steps 604, 606 and 608 shown in FIG. 6. That is, when parsing the set of data objects 604, and applying the defined styles 606 and entering the information into a visual tree 608, some added steps may be performed in a particular embodiment.

Initially, flow 700 begins with apply operation 702 which first recognizes that a list item is to be displayed. Consequently, since the object is a list item, apply operation determines the particular list-item style that should be applied. The list-item style relates to an independently defined set of user interface elements that apply to list-items in general, and independently from the actual data to be presented/displayed in the list. For example, the list-item style may define the background color for the list item or how the user may interact with the list item.

Next, as part of the list item display process, the content presenter is invoked at operation 704, which, in turn provides the indication that a data item is to be displayed. In an embodiment, as the list item display process is progressing, at some point a content presenter action or command is received. This command identifies the actual data object that has the data for display. Next, get style operation 706 gets the style associated with first list item. Get operation 706 is the result of invoking the content presenter, which identifies the object collection and the object to be retrieved, along with information regarding the appropriate or relevant visual style. Once the appropriate style is selected, apply operation 708 applies the appropriate style to the content presenter and inserts the visual information into the visual tree, such as tree 500 shown in FIG. 5. The visual information typically includes UI properties that are data-bound to data properties of the data object.

Determine operation 712 determines whether all the objects have been entered into the visual tree. If there are more objects to add to the visual tree then flow branches YES to operation 702. Operation 702 repeats the process of applying a list item style to the visual tree. Next operation 702 gets content presenter operation 704 which, in turn causes get operation 706 to get the next style associated with the next data item. As may be appreciated, flow 700 is repeated for each object until all objects have been evaluated and their visual representations have been entered into the visual tree. In an alternative embodiment, the determine operation 712 may take other items into account before causing the repetition of flow 700. That is, the determine operation 712 may determine at any time, for any reason, to stop adding visual elements to the visual tree. For example, the determine operation may determine that enough user interface elements have been created to fill the available space such that flow 700 should end at end operation 714. Alternatively, determine operation may determine that a time threshold limit has been exceeded such that no more objects should be added to the visual tree.

When determining which style to apply to the data content, e.g., operation 708 described above in conjunction with FIG. 7, there are several contemplated methods of determining the style. One example has been provided and discussed above in conjunction with FIG. 4. In that example, the style was provided to the list box request as portion 404. In that case, the ItemStyle was specifically provided as the "EmployeeStyle" such that the content presenter recognized that it had to search for and use a defined style named EmployeeStyle (also provided in FIG. 4). This is considered an explicit reference by name of style.

Figure 8:
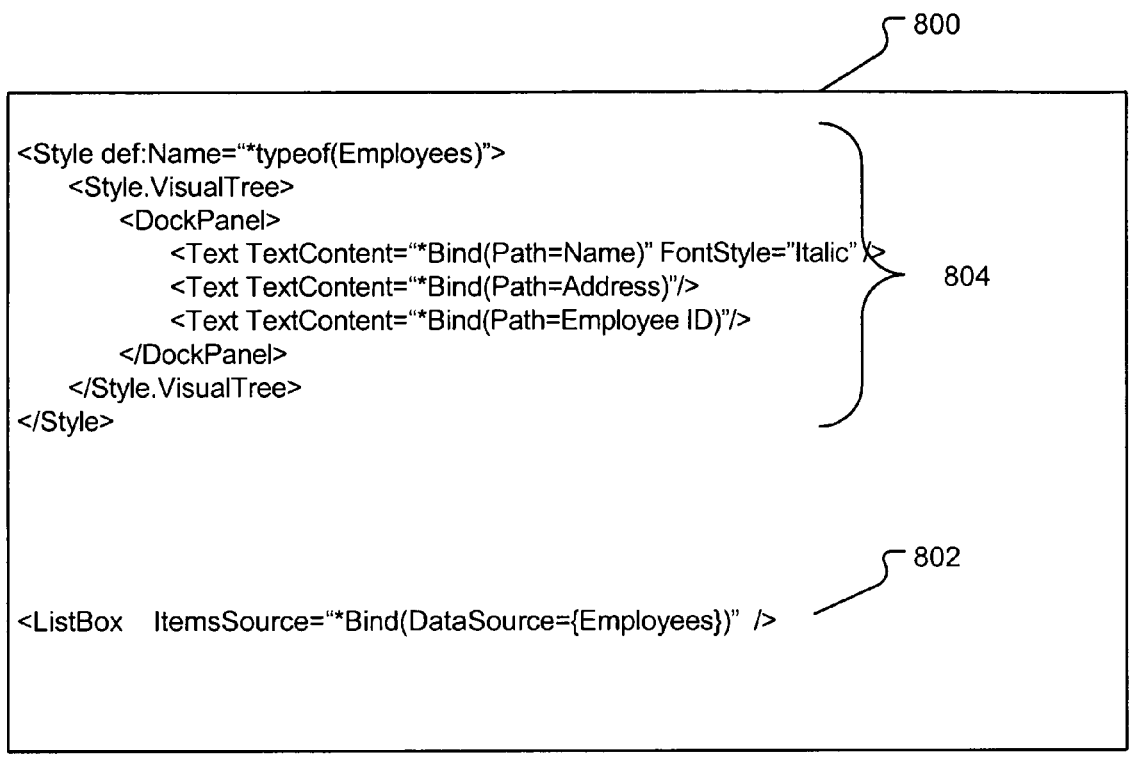
FIG. 8 is an exemplary listing in a mark-up language describing a visual style to be applied to a set of list item objects, identified by object type, along with mark-up language for requesting a display of the list of items in accordance with an embodiment of the present invention.

In another embodiment, the list box request may not provide the item style information and instead may provide only the item source information as shown in line 802 of code snippet 800 shown in FIG. 8. In this case, the tree assembler, such as tree assembler 318 (FIG. 3) recognizes the type of the object to apply a style, i.e., an employee object for the example shown in FIG. 8. Using this type information, the tree assembler is able to search for any styles that are defined based on the type of the object. FIG. 8 illustrates such a defined style in lines 804. In an embodiment, the collection of objects may have many different types of objects, such as employee type objects, customer type objects and others. In order to display a list of these objects, the list box request may simply refer to the types that are to be displayed and the tree assembler identifies the proper style to apply based on this type information.

Figure 9:
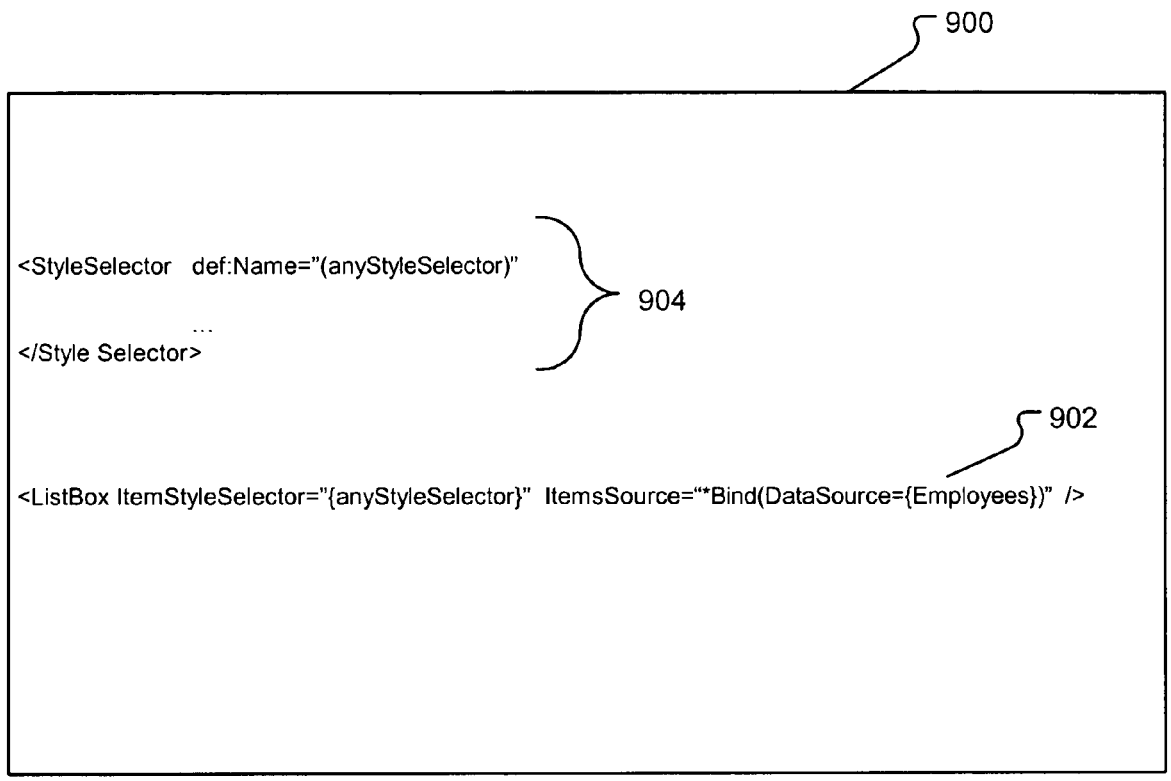
FIG. 9 is an exemplary listing in a mark-up language describing a visual style to be applied to a set of list item objects using style selector functionality, along with mark-up language for requesting a display of the list of items, in accordance with an embodiment of the present invention.

In yet another embodiment, the style information is identified using an "ItemStyleSelector" object in the list box request as shown in line 902 of code snippet 900 shown in FIG. 9. "Style selector", in an embodiment is a class of objects having one method, i.e., SelectStyle. The application developer may cause a style selector object to be instantiated when a list box function is called in order to allow the developer a means of selecting the appropriate style for the appropriate objects. SelectStyle requires that the developer draft the code necessary to instantiate the object, as is known in the art. A sample declaration of such a resource is provided in lines 904 in FIG. 9. This class is particularly useful when an application developer wants to apply different styles to objects of the same type, but having different properties.

In order of priority, in an embodiment, the tree assembler looks for an explicit reference first, then determines whether a style selector has been identified when no explicit style references is indicated. Next, if neither an explicit style reference nor a style selector has been identified, the tree assembler identifies the type of object and searches for a style based on the object type, such as described in conjunction with FIG. 8. Last, if no object type style is defined, then a default style may be applied and/or an error message may be displayed to the user.

The operations described above depend on many different things, such as the collection of items, the values of the properties within the collection of items, the style information, the style selector information, the styles defined for the controls, e.g. the list box control and the list item control, etc. Each of the various elements that help make up the display components may, in fact, change dynamically. The platform, such as platform 314 (FIG. 3) responds to such changes by re-applying the above algorithms as necessary to produce the desired result.

For instance, during the execution of the application, a new object may be added to the object collection, such as object collection 307 shown in FIG. 3, e.g., by use of an add item control such as control 116 shown FIG. 1. In such a case, the tree assembler module, such as tree assembler module 318 is notified of this change. The notification may be an active notification calling to the tree assembler module, or alternatively, the notification may result from the tree assembler module "listening" for such an event. Upon being notified of the change, the tree assembler module may determine whether the insertion is relevant. That is, the tree assembler module may determine whether the change will actually change the current display. In some cases, the tree assembler module may only generate user interface elements to fill one screen or display at a time and thus if the change to the object collection results in an insertion into an "off-screen" area then the tree assembler module may determine that the change is not relevant for the current display and do nothing. If however, the tree assembler module determines that the change is relevant, then the tree assembler module generates or changes the visual tree to include the new objects data items as discussed above and inserts the new user interface elements in the correct place within the visual tree. The new data object will get styled as described above and then the visual tree will be passed to the rendering engine to be displayed as discussed above.

Similarly, when an item is removed from the object collection, the tree assembler module may be notified. The tree assembler module determines the relevance of the removal and, if relevant removes the corresponding user interface elements from the visual tree and thus rebuilds the visual tree. Again, the new tree is passed to the rendering engine for display rendering.

In an embodiment, another type of collection change relates to a "refresh." That is, in some cases the most, if not all, of an object collection may change in some way. For example, when an application module, such as application 302 (FIG. 3) sorts a collection, the collection may send a refresh notification to the system, which causes the tree assembler module, such as module 318 (FIG. 3) to rebuild the visual tree according to the new order of the data items.

When the item style property is changed, a notification is sent to the tree assembler module as well. In some cases the item style may have been used in styling many different objects such that the tree assembler module must determine whether changes are relevant and where. If relevant, a re-styling in all the necessary locations occurs potentially resulting in a new user interface being displayed according to the new style. Accordingly, the same process occurs when the item style selector property changes as well.

Figure 10:
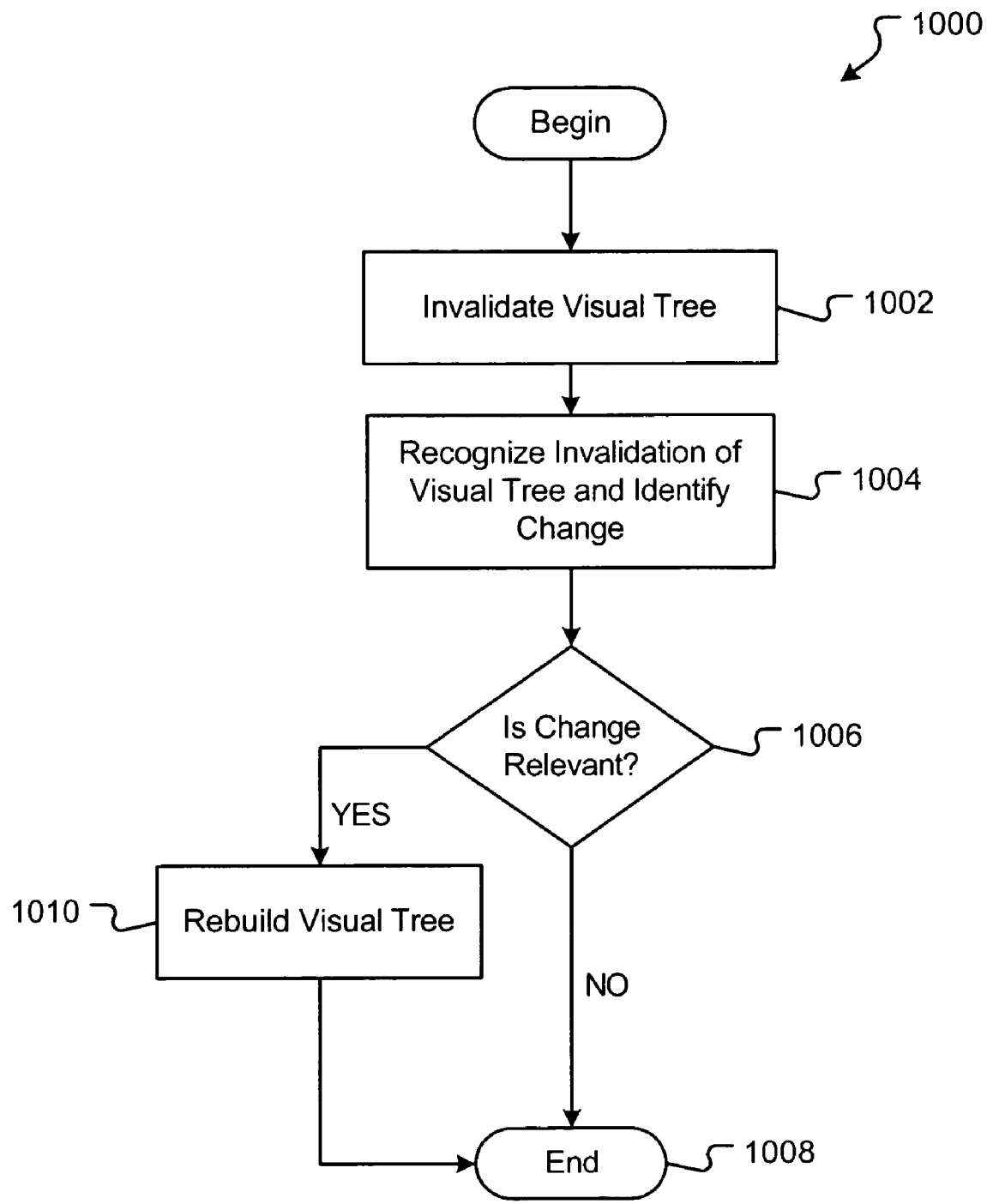
FIG. 10 is a flow diagram illustrating operations for re-rendering a display in response to dynamic changes according to an embodiment of the present invention.

FIG. 10 illustrates a flow diagram of functional components of an embodiment of the present invention in handling dynamic changes to items and styles. Flow 1000 begins once a change has been made to an object collection that is currently being displayed and/or is being prepared for display. The changes to the object collection may relate to the addition of an object, the deletion of an object or a change to an existing object, wherein the change relates to data that is to be displayed. Flow 1000 may also be performed, in other embodiments when a change is made either to an item style or a style selector that applies to the present display or present visual tree.

Flow 1000 begins with invalidate operation 1002 which invalidates the visual tree. In essence, since the visual tree is an internal representation of the data to be displayed and since that data has changed due to a change to the object collection or to the defined styles, the visual tree is no longer valid. Such an invalidation step may involve the setting or clearing of a bit to indicate that the present visual tree is no longer valid.

Next recognize operation 1004 recognizes that the tree is no longer valid. Such recognition may relate to the tree assembler module being notified of the invalidation operation, or the tree assembler module may listen for the type of event.

Upon recognizing that the visual tree is no longer valid, then determine operation 1006 determines if the change is relevant. Determine operation 1006 relates to the evaluation of the change and a comparison against the current display to determine if the change would cause a change in the current display. If not, then flow branches NO to end operation 1008. If the change is relevant, then flow branches YES to rebuild operation 1010. In one embodiment, rebuild operation 1010 begins rebuilding the entire visual tree as described above, in order to capture the change. In other embodiments, the rebuild operation simply identifies where the visual tree should change and makes those changes. Upon rebuilding the tree, the tree is passed to the rendering engine to cause the actual presentation of the display, i.e., the re-rendering of the display. As before, the tree may be passed to a layout engine for added user interface elements prior to passing to the rendering engine. Upon passing to the rendering engine, flow ends at operation 1008. As may be appreciated, upon rebuilding the visual tree, the tree is then "validated" such that when another change is made, the tree can again be invalidated to restart the flow 1000.

As discussed above in conjunction with FIG. 3, the objects in a set may be managed as a collection. By managing the objects in a collection, additional user interface elements may be added, through the use of a defined style, to a "group" of objects. The definition of the group, and how the group-level user interface elements look may therefore be independent of the group itself.

For example, for a collection of data objects, wherein each object relates to one of the past United States Presidents, the collection of objects may be sorted by their last name property. As such, the developer of the user interface elements may decide to display the President objects in groups corresponding to letters of the alphabet. Each group starts on a new line, preceded by a big bold letter, within the group, the names flow left to right. As shown below in Table 1.

TABLE 1

Example of Group User Interface Elements

A

| John Adams | John Q. Adams | Chester Arthur | |
|---|---|---|---|
| 1797-1801 | 1825-29 | 1881-85 | |

B

| James Buchanan | George H. W. Bush | George W. Bush | |
|---|---|---|---|
| 1857-61 | 1989-93 | 2001-present | |

C

| Jimmy Carter | Grover Cleveland | Bill Clinton | Calvin Coolidge |
|---|---|---|---|
| 1977-1981 | 1885-89; 1893-97 | 1993-2001 | 1923-29 |

. . .

Figure 11:
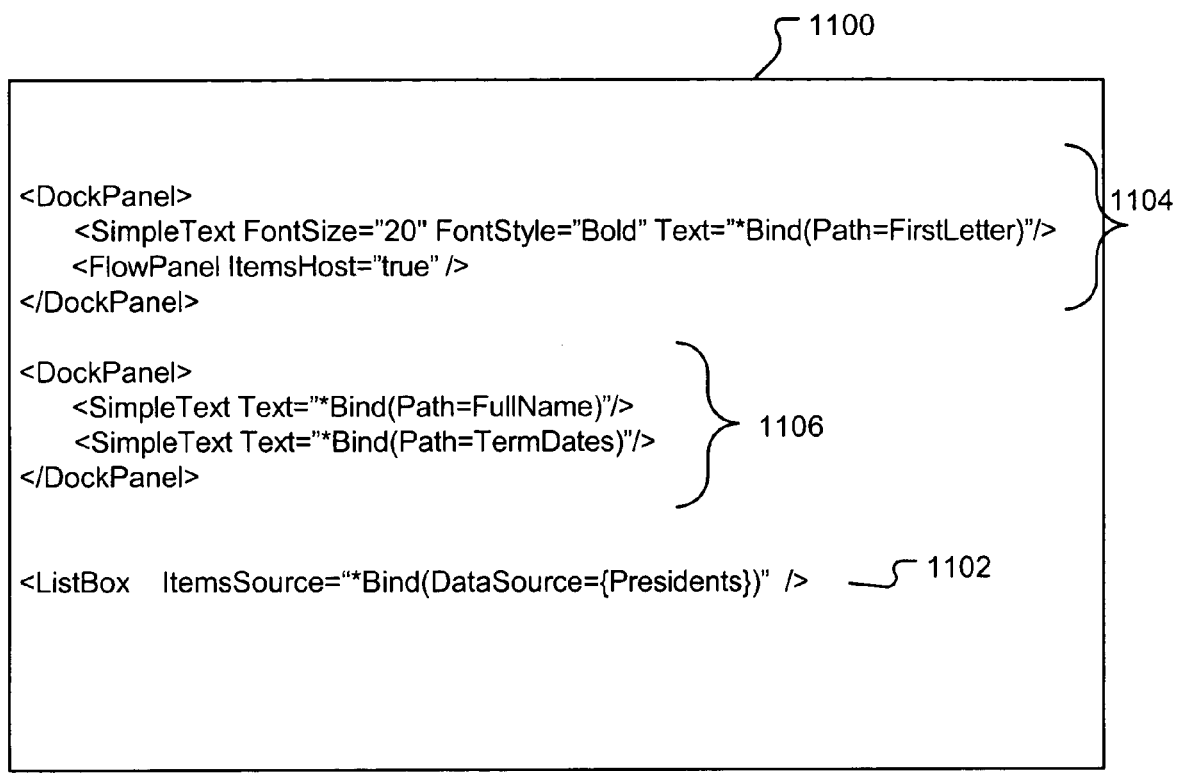
FIG. 11 is an exemplary listing in a mark-up language describing a visual style to be applied to a set of list item objects including group-based user interface elements, along with mark-up language for requesting a display of the list items, in accordance with an embodiment of the present invention.

In the example shown in Table 1, the big letters are not part of the data. Instead the user interface designer supplies such information as (1) A list of groups, each with its own membership test; in the example, a list of 26 groups corresponding to the letters of the English alphabet—the membership test examines the first letter of the last name property; (2) a group template, i.e. the user interface elements to generate for each group, in which the desired position of the actual items is marked such as lines 1104 shown in FIG. 11; and (3) an item template, i.e. the user interface elements to generate for each item, such by providing the relevant portions used in defining an item style above (and shown as lines 1106 for the current example).

In an embodiment of the current invention, application module, such as module 302 (shown in FIG. 3) provides the ability to list a second window, such as window 120 (shown in FIG. 1) that displays details of a listed item from a master list, such as list window 118 (FIG. 1). Indeed, the details window 120 may display most or all of the data properties for a particular object, such as an employee object, where the master list only lists some of the data properties. It will be appreciated that when managing large numbers of data objects, a user may wish to only view the abbreviated set of data properties when viewing the list of different objects but when a particular item is selected, then the user may wish to view all of the information. In an embodiment, the use of such a details window in combination with a master list is considered a "master-detail" implementation.

FIG. 1 illustrates an example that implements the master-detail using data binding. In the example, when the master data item changes dynamically, there is a need to accommodate the change by processing that item's associated detail items. To accommodate this change, data displayed in the detail window 120 is automatically updated. The reason for this is because each of the displayed fields in the window 120 are bound to the actual data records, just as the displayed fields from the window 118.

To further illustrate this example, assume the field of the Name property is bound to data object for Mark Jones using: "<Text TextContent="*Bind(Path=NameField)">" as the command. Since the display command calling the salary information is bound to the actual data record, as soon as a change is made to the data record, the same change is shown in the details window. Similarly, a change in the details window will cause a change in the master window 118, since its information is also bound to the actual data records.

Using the above systems and methods, an application author can provide many different and flexible styling techniques to data used in the application. The defined styles can be used for one or more different objects, in accordance with aspects of the present invention. Importantly, the application author can assign style information in a declarative manner, i.e., the above systems and methods provide a declarative way to program how data looks when displayed and how an end user might interact with the user interface elements and underlying data. In doing so, the data is separated from the user interface elements and style definitions. Consequently, the author or an end user may change the data objects without changing the user interface elements. Likewise, the author may adjust the user interface elements without changing the data objects.

As may be appreciated, many different types of objects may be used in accordance with principles of the present invention, including but not limited to strings, list items, etc. Also, although many of the examples described above dealt with list items and list controls, many other collections of items may be managed and displayed according to principles of the present invention, including but not limited to menus, combo boxes, list boxes, etc. The present invention may be applied to work with any control that manages a collection of items. In an embodiment, the present invention works with all controls that derive from "ItemsControl" as part of the Microsoft Windows® framework. Also, although the invention has been described in language specific to structural features, methodological acts, and computer readable media containing such acts, it is to be understood that the invention defined in the appended claims is not necessarily limited to the specific structure, acts or media described. Therefore, the specific structure, acts or media are disclosed as preferred forms of implementing the claimed invention.

What is claimed is:

1. In a computer system having an operating system platform, a user interface framework system for rendering data according to a visual style defined for the data type, the system comprising:

a plurality of data objects, wherein the plurality of data objects have one or more data fields;

a style definition module for holding one or more visual style definitions to be selectively applied to the one or more data fields of the plurality of data objects;

a style lookup module for locating an associated visual style definition;

a binding module for binding the one or more data fields to one of a properties of the associated visual style definition;

a tree assembler module for generating a visual tree which is an internal representation of a combination of the one or more data fields and the associated visual style definition;

a user interface element factory having additional user interface elements;

a layout engine for adding one or more of the additional user interface elements to the visual tree after the associated visual style definition has been bound to the one or more data fields, wherein the layout engine is able to place said additional user interface elements relative to the physical properties of a display of the computer system; and a rendering engine which uses the visual tree passed to the layout engine which added the one or more user interface elements to render the data for display.

2. The system as defined in claim 1 wherein the plurality of data objects are independent from the one or more visual style definitions.

3. The system as defined in claim 1 wherein the plurality of data objects are displayed as a list.

4. The system as defined in claim 1 wherein the plurality of data objects are displayed as a menu.

5. The system as defined in claim 1 wherein the plurality of data objects are displayed as a combo box.

6. The system as defined in claim 1 wherein the plurality of data objects form a group, and wherein the system further comprises a group visual style definition and wherein the tree assembler module generates the visual tree based on the group visual style, the group visual style being independently defined from the data.

7. A method of displaying one or more data items according to an associated visual style comprising:

receiving a request to display one or more data items;

locating the associated visual style, wherein the associated visual style is independently defined from the one or more data items;

generating a visual tree which is an internal representation of a combination of the one or more data items and the associated visual style;

binding properties of the associated visual style in the visual tree to properties of the one or more data items;

adding additional user interface elements to the visual tree after the properties of the associated visual style in the visual tree have been bound to the one or more data items, wherein the additional user interface elements are placed relative to the physical properties of a display; and rendering the one or more data items for display based on the visual tree having the additional user interface elements.

8. The method as defined in claim 7 further comprising declaring the one or more data items using data objects.

9. The method as defined in claim 7 further comprising:

automatically updating the visual tree in response to a change to a relevant data item.

10. The method as defined in claim 9 wherein the change to a relevant data item involves the addition of a relevant data item.

11. The method as defined in claim 9 wherein the change to a relevant data item involves the deletion of a relevant data item.

12. The method as defined in claim 7 wherein the one or more data items form a list.

13. The method as defined in claim 7 wherein the one or more data items form a menu.

14. The method as defined in claim 7 wherein the one or more data items form a combo box.

15. The method as defined in claim 7 further comprising:

defining a visual style for a group;

associating the one or more data items with the group;

in response to the request to display the one or more data items, locating the visual style for the group; and generating the visual tree based on the visual style for the group.

16. The method as defined in claim 7 further comprising:

detecting a change dynamically in a relevant data item;

invalidating the visual tree;

recognizing the invalidation of the visual tree;

in response to recognizing the invalidation of the visual tree, regenerating the necessary portions of the visual tree; and re-rendering the display based on the regenerated visual tree.

* * * * *